W. C. PRICKETT.
COTTON PICKER.
APPLICATION FILED JUNE 2, 1914.

1,233,907.

Patented July 17, 1917.
3 SHEETS—SHEET 1.

Witnesses

Inventor
William Clifton Prickett,
By
Attorney

W. C. PRICKETT.
COTTON PICKER.
APPLICATION FILED JUNE 2, 1914.

1,233,907.

Patented July 17, 1917.
3 SHEETS—SHEET 3.

Inventor
William Clifton Prickett.

Witnesses
Howard Cruikshank
Nomie Welsh.

By
Attorney

UNITED STATES PATENT OFFICE.

WILLIAM C. PRICKETT, OF BIRMINGHAM, ALABAMA.

COTTON-PICKER.

1,233,907. Specification of Letters Patent. Patented July 17, 1917.

Application filed June 2, 1914. Serial No. 842,496.

*To all whom it may concern:*

Be it known that I, WILLIAM C. PRICKETT, a citizen of the United States of America, residing at Birmingham, in the county of Jefferson and State of Alabama, have invented certain new and useful Improvements in a Cotton-Picker, of which the following is a specification.

My invention relates to a cotton picker designed to be carried and operated by hand and in which a single picking spindle coöperates with a stripping and conveying tube to pick and deliver cotton to a body supported receptacle which is arranged and connected to the rear end of the tube so as not to interfere with the free manipulation of the picker.

I employ a single picking spindle because I regard it as essential to a successful hand cotton picker that the spindle be applied to the bottom boll to be picked. I regard that a machine of the type described to be most successful and practical should possess the following features, namely; the picking spindle should be of small diameter so that it can enter the crotch of a partially open boll to pick the latter clean and it should be rotated so that the cotton when engaged thereby will be wound so closely on the spindle that there is practically no tendency for the cotton locks to pull apart while being drawn away from the boll and wound on the spindle; the picking handle should be operated in combination with a stripping tube having a length sufficient to permit it to be moved freely in all directions to pick cotton from bolls ranging in height from six inches to five and six feet from the ground without requiring the picker to stoop or hold his body in an uncomfortable position: the revolving spindle and its stripping tube should be relatively movable whereby the latter will freely strip the cotton thereinto from the picking spindle and cause it to be fed therethrough for delivery into a body supported receptacle; the tube should be joined to a body supported receptacle in such manner as to require no movement or shifting of the receptacle itself during the manipulation of the picker: the relative movement between the operator's hands in operating the picker should be in the direction of the length of the spindle so as to make easy the directing of the picking spindle to the boll, the preferred means being a screw fed between tube and spindle which requires the operator's hands which support the tube and spindle to move only in line with the direction in which the spindle is being placed: the stripping tube should carry means for engaging and holding the boll when the latter is drawn against it by the relative movement between the tube and the spindle; the picking spindle should be provided with picking points which are protected by guards and which are set at an angle approximately corresponding to the pitch of the feed screw for the spindle, as such an arrangement facilitates the stripping of the cotton without interfering with the effectiveness of the points in engaging and detaching the cotton from the boll: the picking spindle should be provided with a series of helical grooves separated by narrow ridges or shrouds, which act to protect the picking points from the plant and boll and yet to provide ample groove space about the points to permit the latter to most effectively engage the cotton locks, which guards support the cotton on the spindle in a manner to permit the easy stripping thereof rearwardly on the spindle during the reverse movement between the stripping tube and the picking spindle: the stripping means should have yielding strippers normally disposed approximately tangentially to the spindle and adapted to ride freely over the cotton wound on the incoming picker head and to strip the cotton rearwardly from the outgoing spindle, these strippers acting to stop the entrance of burs, leaves or trash and being toothed preferably to engage and hold any cotton caught by the picker head: and the picking spindle, or parts reciprocatory therewith, should preferably pass centrally lengthwise through the stripping tube and should be provided with means which co-act with means in the relatively movable tube to effect the feed of the cotton upwardly through the latter. The cotton is picked by a rotating spindle and is stripped therefrom by a non-rotatable means which pass it up onto the spindle shank or preferably onto a non-rotatable guard sleeve thereabout which moves with the spindle and telescopes over the spindle bearing, feed devices being provided which draw the cotton off the sleeve without carding it and deliver it to the receptacle.

I have designed a machine which is light, which can be easily and cheaply constructed, and which is easy to operate; which possesses the several desirable features of operation hereinabove described; which, due to its construction and manner of operation, can be so quickly operated and manipulated as to very greatly increase the amount of cotton which can be picked with it as compared with the amount which can be picked by hand; and which will deliver the cotton to the body supported receptacle as free from trash, leaves and parts of the bur as cotton picked by hand.

My invention further resides in the various novel details of construction hereinafter more particularly described in their preferred embodiments only, reference being had to the accompanying drawings which form a part of this specification, and in which:—

Similar reference numerals refer to similar parts throughout the drawings.

In its preferred embodiment, my improved picker comprises a stripping tube having a forward member 1, a rear member 2 adapted to be grasped by one hand of the operator and which connects at its rear end with a flaring discharge spout 3 having studs or hooks 4 thereon by means of which the neck portion 5 of a bag 6 can be fastened about the spout. The bag or receptacle 6 is provided with straps 7 by which it can be suspended from the operator's shoulder and has a bottom flap 8 which can be dropped for the discharge of the cotton therefrom. The portion 2 of the stripping tube is preferably set slightly at an angle to the part 1 thereof so that the center line of the end 1 when projected will pass out through the upper part of the tube 2 just above its junction with the spout 3. A bearing for the operating stem 9 of the picking spindle 10 is connected centrally to the top wall of the stripper section 2, the bearing comprising spaced vertical side walls 11 joined at their forward end by a rounded wall or saddle 12 and having out turned flanges 13 which are fastened to the inner top wall of section 2. A tubular member 14 projects forward beyond the wall 12 and is provided at its outer end with a bearing sleeve 15 and a like tubular member 16 projects to the rear and out through section 2. A nut 17 formed in sections is clamped about the outer end of the tube section 16 and the threads of the nut are adapted to mesh with the threads of a screw 18 which is made fast on the rear end of the stem 9. A handle 19 is mounted on a reduced threaded end 20 of the screw 18, antifriction bearings being provided at each end so as to permit the screw to turn freely relatively to the handle. Buffer springs 21 and 22 surround the screw 18 at each end and serve as spring cushions to stop the strokes of the stem 9. The stem 9 at its forward end has a screw shank 23 fastened therein and adapted to be screwed into the head of the picker spindle or head 10, which latter, for the sake of lightness, is preferably made of wood though any suitable material may be used. A thimble or sleeve 24 on the rear end of the spindle 10 overhangs the forward tapering end of a guard sleeve 25 which surrounds the stem 9 extending from the spindle 10 rearwardly thereof, said guard sleeve being cylindrical at its forward end and having the upper half of its rear end 26 cut away to leave a bottom half circular member which travels back and forth under and fits snugly about the bottom of the spindle bearing. The thimble thus bridges the running joint between the rotatable head and the non-rotatable guard sleeve and is preferably countersunk in the spindle 10. The thimble may flare slightly to correspond with the taper of the sleeve 25, which at its forward end carries a bushing 26ª in which the stem 9 is free to turn. The cylindrical rear end of sleeve 25 telescopes over the forward extension 14 of the bearing and in the retracted position of the spindle is spaced a short distance from the forward wall 12 of the spindle, as may be seen in Fig. 6. The sleeve rotating spindle, I connect the parts for this purpose preferably by attaching the sleeve to the grip hook 40, thus connecting the sleeve with the handle 19 in which the spindle freely turns. The stem 9 is preferably formed of light pipe, into the ends of which screws 18 and 23 are inserted and riveted. In like manner the sleeve 25 and stripping tube are formed of sheet metal as light as is consistent with the duty required of the parts.

Figure 12:
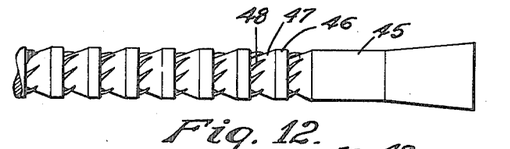
Figs. 12 and 13 are side and end views of one form of a picking spindle.
Figure 13:
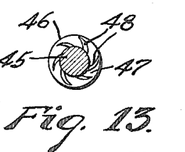
Figure 14:
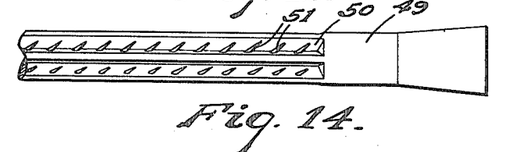
Fig. 14 is a view of a modified form of spindle.
Figure 15:
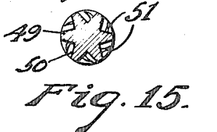
Fig. 15 is a cross-sectional view of Fig. 14.
Figure 16:
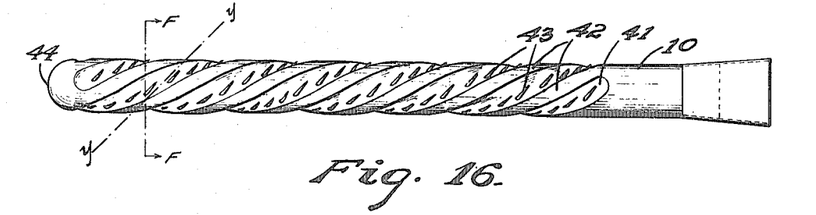
Fig. 16 is a view of the preferred type of picking spindle.
Figure 17:
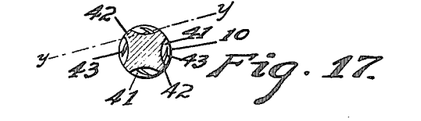
Fig. 17 is a cross section of Fig. 16 on the line F—F.
Figure 18:
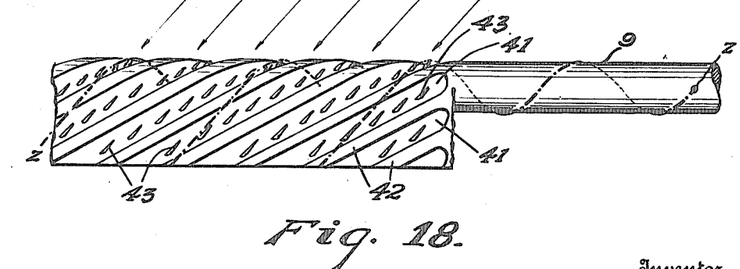
Fig. 18 is a diagrammatic layout of the grooves and shrouds of the picker spindle shown in Fig. 16, with the dotted lines indicating the difference in pitch between the feed screw for the spindle and the grooves thereof.

In Figs. 12, 14 and 16 several forms of picker heads are shown. In Fig. 16 I show the preferred form of picker head which comprises a cylindrical wooden body around the periphery of which are cut a plurality of helical grooves 41 which are spaced by narrow helical shrouds or guards 42. The grooves are concave and wide relatively to the width of the shrouds 42, and in my preferred construction there are four of such grooves having a pitch so that a straight line y—y in Figs. 16 and 17, when inclined to correspond with the pitch of the feed screw, will touch the opposite sides and the center also of the groove. The advantage of this arrangement is that in its helical travel the spindle guards do not tend to hold the cotton, as it is wound thereon, out of the grooves but permit it to be wound down thereinto closely about the rearwardly inclined picking teeth 43, which are mounted in the bottom of the grooves with their ends bent so as not to be exposed above the shrouds. It will be noted that the teeth 43 are inclined to correspond with the pitch of the screw, which, as seen in Fig. 18, is indicated by the dotted line z—z and which is preferably greater than the pitch of the grooves. The grooves all terminate short of the outer end 44 of the spindle which is rounded over. In Fig. 12 I show a modified form of picking spindle 45 having annular spaced shrouds 46 between which are grooves having tapering bottom walls 47 which are overhung by picking teeth 48. In Fig. 14 I show another form of picker head 49 having longitudinal grooves 50 therein provided with picking teeth 51. The teeth 48 and 51 are also inclined in line with the pitch of the feed screw. The spindle 45 is best suited for picking but is hard to strip as the cotton will cling in the grooves. The spindle 49 is best suited for stripping but is not most desirable as a picker because the ribs between grooves hold the cotton away from the picking teeth. The spindle 10, however, for the reasons above given, is effective as a picker and can be easily stripped because the shrouds 42, being inclined at a different pitch from the feed screw, will shift under the cotton and assist in clearing it from the picking teeth when the spindle's movements are reversed after drawing cotton into the stripping tube.

Figures 1, 2, 3, 19:
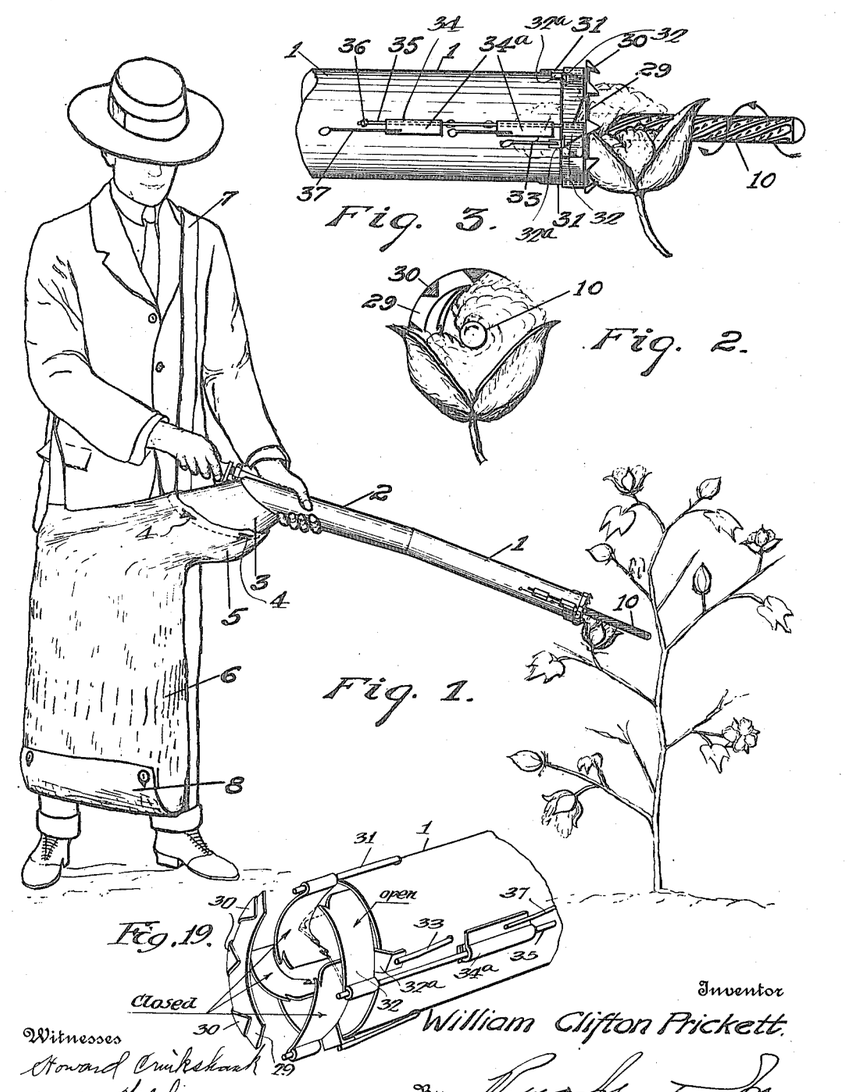
Figure 1 is a view showing the cotton picker in operation, the spindle being shown extended beyond the stripping tube.
Fig. 2 is an enlarged end elevation of the picker as shown operating in Fig. 1.
Fig. 3 is a side elevation of Fig. 2.
Figures 4, 5, 6, 7, 8, 9, 10, 11:
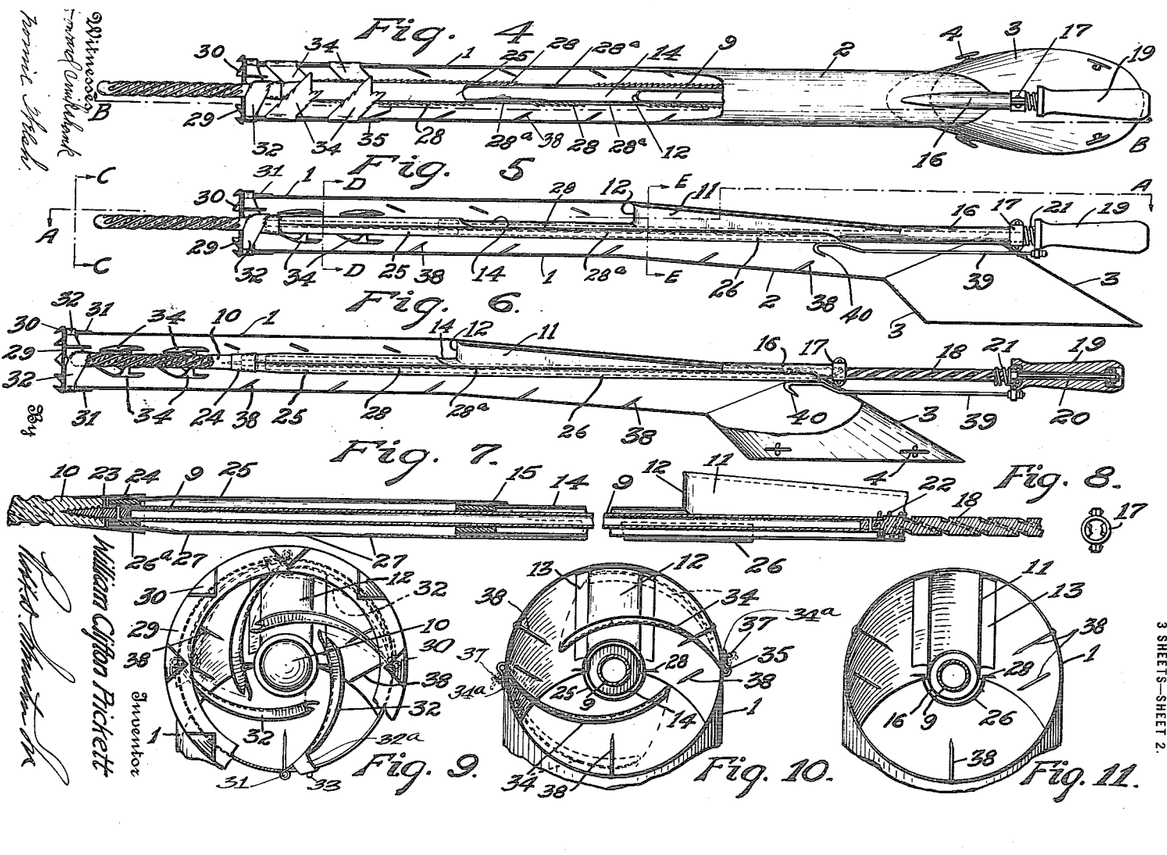
Fig. 4 is a plan view of the picker shown with the stripping tube broken away on the line A—A of Fig. 5 to show the internal mechanism.
Figs. 5 and 6 are sectional views taken on the line B—B of Fig. 4, and showing the spindle in extended and retracted positions.
Fig. 7 is a detail vertical sectional view through the picking spindle and its bearings.
Fig. 8 is an end elevation of the nut for the spindle driving screw.
Fig. 9 is an end view of Fig. 5, looking in the direction of the arrows C—C.
Figs. 10 and 11 are enlarged cross-sectional views respectively on the lines D—D and E—E of Fig. 5.

In operation, having assembled the apparatus and adjusted its parts as shown in Fig. 1, relative movement in line with the stem 9 between the picking spindle and the stripping tube 1 will produce by means of the screw 18 and nut 17 a rotation of the spindle as it is drawn into and projected beyond the stripping tube. Generally the stripping tube is held more or less stationary while the picker spindle is drawn inwardly causing its teeth to follow the helical path indicated in Fig. 3, or both parts may be reversely moved simultaneously or the tube only can be reciprocated on the spindle. The teeth 41 will pass over every part of the bur or cotton boll over which the rotating spindle is placed and when a cotton lock is engaged thereby it is wound around the small spindle which takes continuous grip thereon as it rotates and exerts a constant and even pull to draw the lock entirely out of the boll, it being noted that the spindle is small enough to be inserted well down into the crotch of the boll when the locks are firmly attached to the latter. The relative axial movement between the collecting tube and spindle will bring the boll against the points 30 which hold it against rotation while the cotton is being drawn therefrom. Parts of the bur which tend to work into the open end of the tube and which might get past the points 30 are engaged by the guard fingers 32 which lie pressed against the wound mass of cotton on the spindle from all four sides and which effectively hold back the bur, leaves, twigs and foreign matter from being drawn into the tube with the cotton. The open spaces between these guards permit arrested matter to fall therethrough. After the cotton has been wound on the spindle, as shown in Figs. 1 and 2, and the latter has been fully retracted into the stripping tube (see Fig. 6), the reverse relative movement between spindle and stripping tube will impart a reverse rotation to the picker spindle which results in the picking teeth 43 being backed out of the cotton in a direction reverse to their rearward inclination and at the same time the cotton is held by the fingers 32 and 34 and stripped from the picking end of the spindle as it moves forward freely through the cotton and into position for another operation. It should be noted that the guard fingers 32 and stripping fingers 34 are given substantial width where they overhang the spindle and this width is sufficient to prevent the fingers passing between the shrouds 42 and striking the teeth in cases where the lateral play of the spindle causes it to strike a finger. In other words, the finger width is sufficient to cause it to always ride on a guard when in contact with the spindle. The stripping means shift the cotton from the rotary spindle to the non-rotary but re- 25 has a series of dust escape holes 27 in its bottom, and along each side of the sleeve and its rear end 26 I provide a row of rearwardly disposed teeth 28 which, as seen in Fig. 4, are interrupted, one side having two blank spaces 28ᵃ between which is a strip of teeth disposed opposite a blank space 28ᵃ on the opposite side of the spindle. These blank spaces are disposed to travel back and forth past the bearing wall 12 and are staggered so that the teeth first on one side and then on the other as they pass the bearing wall 12 will strip the cotton alternately to one side and then to the other of the sleeve 25 and will not pull it to both sides of the bearing at the same time.

At its front end the stripper tube 1 is provided with a ring plate 29 having about its periphery a series of V-shaped teeth 30 which project forwardly and inwardly at an incline toward the picker spindle. These teeth are adapted to engage and hold the bur when drawn against the stripping tube, as will perhaps be more clearly seen in Fig. 3, but, having their side walls inclined to the rotating path of travel of the entering cotton, they do not interfere with it being drawn in by the rotating spindle. The end of the stripper tube 1 is provided with a series of pins 31 which support the guard ring 29 and upon which are mounted guards 32, of which there are preferably four spaced equi-distantly and yieldingly held preferably by separate springs 33 with their inner ends approximately tangential to and slightly spaced from the picking spindle 10. As shown in Fig. 9 these guards are formed by metal strips bent to be slightly concave on their inner faces and preferably having the curvature of the tube. The guards have a greater length than the radius of the tube and therefore may be said to overhang the spindle. The forward edges of the guards are beveled or turned outwardly and they are disposed crosswise of the spindle so that their edges (see Fig. 6) are slightly inclined to the rear. They are provided with stripping teeth on their front and rear side edges and are disposed so closely behind the ring 29 that the teeth along their forward edges will engage and hold any cotton which passes the ring, thereby preventing the loss of cotton which is caught by the extreme end teeth on the spindle. When the hinged guards 32 are fully expanded apart by the entering cotton on the spindle, they swing outwardly until their inner curved faces lie flush with the inner peripheral wall of the tube, as shown in dotted lines, Fig. 9. Immediately behind the guards 32 I arrange two oppositely disposed pairs of stripper fingers 34 which are passed through slots in the end of the stripper tube and pivoted in pairs on pins 35 suitably attached at 36 (see Fig. 3) to the stripping tube. Springs 37 are also attached to the outer wall of the stripping tube and engage and yieldingly hold these stripper fingers pressed inwardly in close juxtaposition to the sleeve 25. The guards 32 and fingers 34 are each provided with stops 32ᵃ and 34ᵃ (see Fig. 3) which engage the tube and hold the guards and fingers slightly spaced from the spindle and picker head. As seen in Figs. 4 and 10 these stripper fingers 34 are arranged at opposite sides of the sleeve 25 so as not to interfere with the teeth 28 thereon. These fingers and guards 34 are provided with teeth on their forward and rear edges and are peculiarly shaped as seen in Fig. 4 and inclined sharply toward the rear. These combined guards and strippers 32 and 34 are made flexible or yielding either by the use of springs or by reason of utilization of spring metal to form them and they are preferably so attached to the tube as to yield freely away from the cotton as it is drawn into the tube while serving to hold or clamp the cotton sufficiently to permit rotation as the spindle is rotated rearwardly in its outgoing movement. In other words, they are designed to permit the cotton to be wound freely under and beyond them with the entering spindle and to press on and hold the mass of cotton wound on the spindle so that as the spindle is reversely rotated and moved outwardly of the tube, it will free itself from this held mass of cotton and move freely lengthwise therethrough, the cotton by this means being held wound about the spindle and free to be forced rearwardly therefrom onto the sleeve 25. The spring pressure exerted by the strippers is just sufficient to hold the cotton and their design is such that the cotton cannot wedge itself between them and the spindle to lock the latter. The inner wall of the stripper tube is provided with rearwardly inclined pins 38 which extend practically to the spout 3 and serve to hold the cotton against a forward movement in the tube after it has been stripped by fingers 32 and 34 from the picker spindle and moved onto sleeve 25 after which the relatively movable teeth 28 and 38 feed it rearwardly of the tube. In order to draw the cotton forward over the spout 3 I connect to the handle 19 a rod 39 which passes through a suitable opening provided for it in the spout 3 below and in line with the screw 18. Its inner end is upturned and provided with a rearwardly and downwardly inclined hook end 40, which, as seen by comparing Figs. 5 and 6, will, during the operation of the device, travel between the rear teeth 38 and a point above the center of the spout 3. In its preferred construction the sleeve 25 is not rotatable and since it is desirable and necessary that the sleeve should reciprocate axially with the ciprocatory sleeve 25 and as the operations are repeated the teeth 28 on the reciprocating sleeve 25 serve to continuously force the stripped cotton rearwardly along the sleeve, the teeth 38 holding it at all points against forward movement. The cotton as it reaches the rounded end wall or saddle 12 of the picker bearing, is parted by the staggered teeth 28, which move past the saddle and on each side thereof with the sleeve 25, the locks being drawn to one side or the other of, and carried forward along under the bearing until engaged by the hook 40 which draws the cotton into position to fall into chute 3 and pass into the bag 6. The picker spindle projects sufficiently beyond the stripping tube to enable it to be accurately placed; the relative movement between the picker spindle and stripper is so small that it can be effected with almost instantaneous rapidity; the stripping devices will clear the cotton easily and effectively from the spindle without tearing the cotton locks. The length of the stripping and conveying tube is such that the operator can direct the picker to the available cotton without stooping and the movements of the hands maintain perfect control of it and the manner of connecting it to the bag is such that it can be freely manipulated without movement of the bag.

Though I have referred throughout to a screw means for rotating the spindle, obviously equivalent mechanical means may be employed which give the spindle the desired rotating movement as it reciprocates so that the teeth will follow a helix having the desired pitch.

The application of my improved picking and stripping means may be readily adapted for use with any type of picker in which the cotton is mechanically disengaged or loosened from the boll. Also various other means may be selected for the purpose of conveying the cotton after being stripped from the picker to a receptacle. Obviously, either the picker or the stripper may be regarded as the reciprocatory member, it being only necessary that relative axial movement be provided for between said parts by means of which the picker with the cotton collected thereon can be brought into the proper position for being stripped by the stripper.

What I have shown and described constitutes what I regard as the preferred embodiment of my invention, but I desire it understood that changes consistent with the scope of the appended claims may be made without departing from the spirit of my invention.

What I claim as new and desire to secure by Letters Patent, is:—

1. In a cotton picker, in combination, a stripper, a rotatable picker spindle, a picker head rotatable with the spindle, a non-rotatable sleeve surrounding the spindle within the stripper, said picker head and sleeve being relatively movable, and cotton engaging elements on said picker head and stripper which are disposed to coöperate as said parts move relatively to force the cotton rearwardly from the spindle onto said non-rotatable sleeve, as and for the purposes described.

2. In a cotton picker, in combination, a rotary picker spindle having a picker head rotatable therewith, a non-rotatable toothed member on the spindle, stripper means reciprocable relatively to said picker head and toothed member, and teeth on said stripper means adapted to advance the picked cotton from the picker head onto said non-rotatable toothed member, substantially as described.

3. In a cotton picker, a reciprocatory picker spindle comprising rotatable and non-rotatable sections, a stripping means adapted to move the cotton from the rotatable to the non-rotatable spindle sections, and means to draw the stripped cotton off the non-rotatable section of the spindle.

4. A rotatable spindle having a picking end, a sleeve surrounding the spindle and extending from said picking end rearwardly, and a cotton collector having strippers adapted to force the cotton rearwardly off the picking end onto said sleeve.

5. A rotatable spindle having a picking end, a sleeve surrounding the spindle and extending from said picking end rearwardly, means to strip the cotton onto said sleeve, and means to take the cotton off said sleeve.

6. A rotatable spindle having a picking end, a sleeve surrounding the spindle and extending from said picking end rearwardly, a cotton collector having strippers adapted to force the cotton rearwardly off the picking end onto said sleeve, means to take the cotton off said sleeve, and means to feed the cotton lengthwise along the collector.

7. In a cotton picker, a reciprocatory and rotary picking spindle, a bearing therefor, a toothed member movable axially with the spindle and telescoping over said bearing, means to strip the cotton from the spindle onto said member, and force it toward the bearing, and staggered sets of teeth on said member which co-act with relatively movable teeth to draw the cotton off said member to one side or the other thereof.

8. In a cotton picker, a rotatable picking spindle having a toothed picker head at one end, a stripping receptacle, said spindle and receptacle being relatively removable to draw the picker head thereinto, a bearing in which the spindle moves in said receptacle, and a sleeve movable axially with the spindle and adapted to cover the portion thereof exposed between the picker head and the bearing, substantially as described.

9. A picking spindle comprising an operating stem, an enlarged picker head mounted on one end thereof, a sleeve surrounding the stem and forming a non-rotatable inclosure for the stem having substantially the same diameter as the picker head, means to strip the cotton from the picker head onto said sleeve, means to rotate the stem, a bearing for said stem, and means to hold the sleeve against rotation, substantially as described.

10. In a hand operated cotton picker, an elongated spindle, a handle mounted on one end and a picking head on the other end of said spindle which is free to rotate in said handle, a tubular member surrounding the spindle and movable axially thereof, driving means actuated by the relative movement between the spindle and tubular member to rotate the former, means on the tubular member to strip the cotton from the picking head thereinto, and coöperating conveying teeth on the relatively movable tubular member and spindle for moving the stripped cotton through the tubular member, substantially as described.

11. In a cotton picker, a tubular casing having stripping means at one end thereof, a reciprocable and rotatable picker spindle in said casing and arranged to co-act with said stripping means, a spindle bearing in the casing, and a non-rotatable sleeve movable with the spindle and adapted to guard the portion of the spindle in the casing that contacts with said bearing.

12. A picker spindle, a collector and stripper means through which the spindle passes, said means and spindle being relatively movable axially of the spindle, a bearing for the spindle in said collector, and a sleeve movable with the spindle and adapted to telescope over the forward end of the bearing throughout its operating positions.

13. A picker spindle, a collector and stripper tube through which the spindle passes, said parts being relatively movable axially of the spindle, an elongated bearing in said tube for the spindle, and a sleeve movable with the spindle and adapted to telescope over the forward end of the bearing.

14. In a cotton picker, a rotatable spindle comprising a picker head with lateral inclined teeth at one end and a non-rotatable sleeve with rearwardly inclined teeth surrounding the spindle to the rear of the picker head, means to rotate the spindle, and a reciprocatory tube having stripping and conveying members which travel with the tube back and forth over said picking head and sleeve and having a spindle bearing which telescopes into said sleeve, substantially as described.

15. In a cotton picker, a tube having an internal bearing provided with an elongated forward tubular extension, a spindle mounted in said bearing, screw means to rotate the spindle, a picker head on one end of said spindle and a handle journaled on the other end, a sleeve surrounding the spindle and telescoping over the forward end of the bearing, and a connection from the handle to said sleeve to move it with the spindle axially while holding it against rotation.

16. In a cotton picker, in combination, a rotatable stem, a picker head at one end of the stem and a handle journaled at the other, means to rotate the stem, a tubular member which surrounds an intermediate portion of the stem, a bearing carried by said member for the stem, a non-rotatable sleeve connected to said handle and inclosing the exposed rotating portion of the stem within the tube, means at the forward end of the tube to strip the picker head, and co-acting teeth on the tube and sleeve for feeding the cotton through the tube, substantially as described.

17. In a cotton picker, an elongated spindle having a picker head at one end and a handle on its other end in which said spindle is free to rotate, an elongated tube through which said spindle passes, means to rotate the spindle by the relative axial movement of said tube thereon, a bearing for the spindle in said tube, a non-rotatable sleeve extending from the spindle head to and telescoping over the spindle bearing, said sleeve being non-rotatable and having a rearward extension which extends under the bearing, inclined teeth on the sleeve and extension, and stripping means at the front end of said tube which engage and strip cotton from the spindle only when moved rearwardly of the spindle and which act to move the cotton from the rotating spindle onto said sleeve and draw it off therefrom.

18. In a cotton picker, a rotatable and reciprocable picking spindle having one or more helical grooves surrounding it, outwardly projecting picker teeth in each groove, means to cause said teeth to move in a helical path of travel, and means to strip the cotton endwise from the spindle, said teeth being inclined rearwardly and laterally in the direction of their helical path of travel.

19. In combination, a rotary and reciprocatory spindle, means to rotate the spindle, a collecting chamber into which the spindle is movable to be stripped, internal flat strippers mounted in said chamber and inclined rearwardly and having stripping teeth on their front and rear facing side edges.

20. In a cotton picker, a spindle, a driving screw for rotating the spindle when moved axially thereof, a picker head on the spindle, helical grooves about the picker head having a different pitch from that of the driving screw, and picking teeth in said grooves, substantially as described.

21. In a cotton picker, a spindle, a driving screw for rotating the spindle when moved axially thereof, a picker head on the spindle, helical grooves about the picker head having a greater pitch than that of the driving screw, and picking teeth in said grooves, substantially as described.

22. In a cotton picker, a reciprocable spindle having a handle and driving screw at one end to rotate it and a picking head at the other end, said head comprising a plurality of wide shallow grooves wound helically thereabout and spaced by relatively narrow shrouds, said grooves having a greater pitch than that of the driving screw, and picking teeth disposed in said grooves and protected by said shrouds and inclined toward the handle and in line with their helical path of travel, substantially as described.

23. In a cotton picker, the combination with a rotatable spindle having a picking head and a driving screw for rotating the spindle, of a helical groove on the picker head having a different pitch from that of the feed screw, and teeth in said groove inclined to correspond with the pitch of the feed screw, substantially as described.

24. In a cotton picker, a reciprocable picker head, and means to rotate it comprising a driving screw, said head having one or more helical grooves which are shallow relatively to their width and which have a pitch differing from that of the drive screw so that a straight line passing diagonally across the groove will touch the bottom and side edges thereof and lie substantially in line with the pitch of the feed screw, substantially as described.

25. In a cotton picker, in combination, a rotatable toothed picking spindle and a stripping and conveying tube therefor which are relatively movable axially to draw the spindle into the tube, and stripping devices in the tube which extend from the sides thereof inwardly with an inclination away from a radial line and inclining in the direction of rotation of the entering spindle, said strippers being greater in length than the radial distance between the tube and spindle so that their inner free ends project past the spindle.

26. A picker spindle and collecting tube therefor which are relatively movable axially of the spindle, means to rotate the spindle as it passes into said tube, teeth on the spindle inclined in the direction of their helical path of travel, and strippers for the spindle mounted on the tube and inclined in the same direction as the teeth, substantially as described.

27. A picker spindle and collecting tube therefor which are relatively movable axially of the spindle, means to reversely rotate the spindle as it passes into and out of said tube, teeth on the spindle inclined in the direction of their helical travel while entering the tube, and strippers yieldably mounted in the tube and disposed crosswise of and inclined in the same direction as the teeth, substantially as described.

28. A picker spindle and collecting tube therefor which are relatively movable axially of the spindle, means actuated by the rearward movement of the spindle in the tube to rotate the spindle, teeth on the spindle inclined in their direction of helical travel as they enter the tube, and yieldable strippers carried by the tube and having their flat faces transversely overhanging the spindle.

29. A picker spindle and collecting tube therefor which are relatively movable axially of the spindle, means actuated by the reciprocatory movement of the spindle in the tube to reversely rotate the spindle, teeth on the spindle inclined in their direction of helical travel as they enter the tube, and flat yieldable strippers carried by the tube and mounted to extend from the side of the tube crosswise of and at least half way over the spindle and in the direction of inclination of the teeth.

30. A picker spindle, means to rotate it, a stripper and collector tube for the spindle, said parts being relatively movable to move the picking end of the spindle into and out of the tube, and stripping fingers greater in length than the tube radius and mounted transversely of the tube with their free ends projecting beyond the spindle.

31. In a cotton picker, a rotatable picking spindle having thereon outstanding picker teeth that are inclined away from an axial plane through the spindle and lean in the direction of their path of travel when moving to pick cotton, stripping means comprising a support and yielding strippers thereon, the free ends of which are movable toward and away from the axis of the spindle, and means to prevent the engagement of said teeth with said strippers.

32. In a cotton picker, a rotatable picking spindle having rearwardly and laterally inclined teeth, spring strippers movable lengthwise along the axis of the spindle and yieldingly held transversely of said spindle and disposed substantially in the direction of inclination of said spindle teeth.

33. In a cotton picker, the combination with a rotatable picking spindle having teeth along its side, of yieldable strippers, said strippers and spindle being relatively reciprocable axially of the spindle, means to rotate the spindle in a given direction as it passes into position between the strippers which are inclined in said direction of rotation of the spindle, substantially as described.

34. In a cotton picker, the combination with a rotatable picking spindle, of a cotton stripper and collector, said stripper and spindle being relatively reciprocable axially of the spindle, means to rotate the spindle during each reciprocatory movement of the stripper, said stripper having stripping means yieldable to pass forward over the cotton on the rotating spindle and having stripping teeth which strip the spindle when moved relatively rearwardly thereof.

35. In a cotton picker, in combination, a stripping tube, a picking head rotatably mounted centrally thereof, means for producing relative axial movement between the picker head and said tube to cause the former to project from and be retracted into the latter, means to rotate the picker head during such movements, and yieldable strippers carried by the tube and substantially tangentially disposed to the spindle, substantially as described.

36. The combination with a reciprocatory and rotary picking spindle, of a stripping means therefor comprising a tubular member through which said spindle projects, and guard fingers yieldably mounted beyond the end of the tube and inclined in the direction of rotation of the spindle as it passes into the tube.

37. The combination with a reciprocatory and rotary picking spindle, of a stripping means therefor comprising a tubular member through which said spindle projects, and yieldable guard fingers connected to the tube and inclined in the direction of rotation of the spindle as it passes into the tube, said fingers being curved and having their concave faces overhanging the spindle, substantially as described.

38. In a cotton picker, the combination with a reciprocatory and rotary picking spindle, of a stripping means therefor comprising a tubular member through which said spindle is adapted to project, said member having openings about its end, and guard fingers mounted therein opposite said openings and inclined in the direction of rotation of the spindle as it is drawn into the tube, the free ends of the fingers being yieldably held toward the spindle, substantially as described.

39. In a cotton picker, the combination of a reciprocatory and rotary picker, of a stripping tube through which said picker projects and which has outturned tapered bur engaging points surrounding its outer open end, substantially as described.

40. In a cotton picker, the combination of a reciprocatory and rotary picker, of a stripping tube through which said picker projects, out-turned bur engaging points about its outer open end, and bur stops which project inwardly substantially radially from the sides of the tube over the spindle and are yieldable outwardly.

41. In a cotton picker, the combination of a rotatable picking spindle, a stripping means movable axially over the spindle and adapted to strip the spindle as it moves rearwardly thereof, and out-turned tapered bur engaging teeth on the front end of said stripping means, substantially as described.

42. In a cotton picker, a rotatable picking spindle, stripping means movable axially of the spindle, and an annular series of tapered teeth disposed in front of the stripping mechanism and adapted to engage a cotton bur while cotton is being twisted therefrom by the spindle.

43. In a cotton picker, a rotatable picking spindle, a stripping member surrounding and spaced from the spindle and movable axially thereof, said member having bur engaging teeth surrounding its front end and having yielding fingers which guard the clearance between tube and spindle and are adapted to strip said spindle toward the rear end thereof.

44. A cotton picker comprising a rotatable picking spindle, a reciprocatory member movable thereon, means movable with the member to rotate the spindle, stripping means on the forward end of said member which travel back and forth over the spindle and are adapted to strip it toward the rear thereof, and tapering bur engaging points disposed in advance of the stripping means, substantially as described.

45. In a cotton picker, the combination with an elongated tubular member having stripping means at its outer end, of a picking spindle relatively movable to bring its picking end into and out of operative position relatively to said stripping means, and conveying devices extending lengthwise of both spindle and tubular member which coact to feed the cotton up through said member, substantially as described.

46. A rotatable picker stem, a non-rotatable stripping and conveying tube, which parts are relatively and axially movable, a non-rotatable member movable axially with the picker stem and having at its inner end a hook disposed to engage and draw the stripped cotton rearwardly through the tube, and means to rotate the picker stem.

47. In a cotton picker, the combination with a body supported receptacle, of an elongated tubular member connected at its inner end to said receptacle and adapted to be gripped by the operator's hand near its said point of connection, an axially movable operating mechanism for a picking spindle disposed adjacent to said grip portion of the tube and operable by the operator's other hand, a picking spindle rotatable by said mechanism and movable axially of said tubular member to project and retract its picking end from and into the outer end of said member, means to strip the spindle into said member, and means to feed the cotton therethrough into said receptacle.

48. In combination, a tube having stripping means, a rotatable spindle having a picker head and being axially movable relatively to said stripping means, a non-rotatable guard for the exposed portion of the spindle in the tube, and a hook member rigidly attached to said guard and loosely connected to the spindle and reciprocable therewith.

49. In a cotton picker, the combination with a rotatable spindle having a picker head and a handle in which the rear end of the spindle is journaled, of a cotton stripper and collector reciprocatory lengthwise about the picker head of the spindle when the handle on the latter is held motionless, and means to rotate the spindle as it reciprocates into and out of the stripper.

50. A rotatable and reciprocable picker spindle, a stripper means surrounding the spindle, a guard surrounding the spindle and onto which said stripper means moves the cotton stripped from the spindle, means to detach the cotton from the guard and feed it rearwardly, means to rotate the spindle as it is reciprocated, a handle in which the spindle is rotatably mounted, and means to connect the handle with the guard.

51. In combination, a rotatable spindle, a picker head on the spindle, a non-rotatable spindle guard, means to hold the picked cotton on the guard against forward movement with the spindle, a sleeve on the rotatable head overlapping and bridging over the joint between said head and guard, and means to strip cotton from the head onto said guard.

52. In combination, a rotatable picking spindle having helically arranged picker teeth thereon, helical shrouds for said teeth, and a stripping finger disposed crosswise of the spindle and made wide enough to always engage at least one of the shrouds when in contact with the toothed portion of the spindle.

53. In combination, a rotatable picking spindle, stripping fingers disposed crosswise of the spindle, stop means to space the fingers from the spindle where they overhang same, and yielding means to urge the fingers toward the spindle.

In testimony whereof I affix my signature in presence of two witnesses.

WILLIAM C. PRICKETT.

Witnesses:
NOMIE WELSH,
R. D. JOHNSTON, Jr.